July 1, 1941. G. C. PAPENDICK ET AL 2,247,699
SLICED LOAF FRACTIONATING EQUIPMENT
Filed June 21, 1939 2 Sheets-Sheet 1
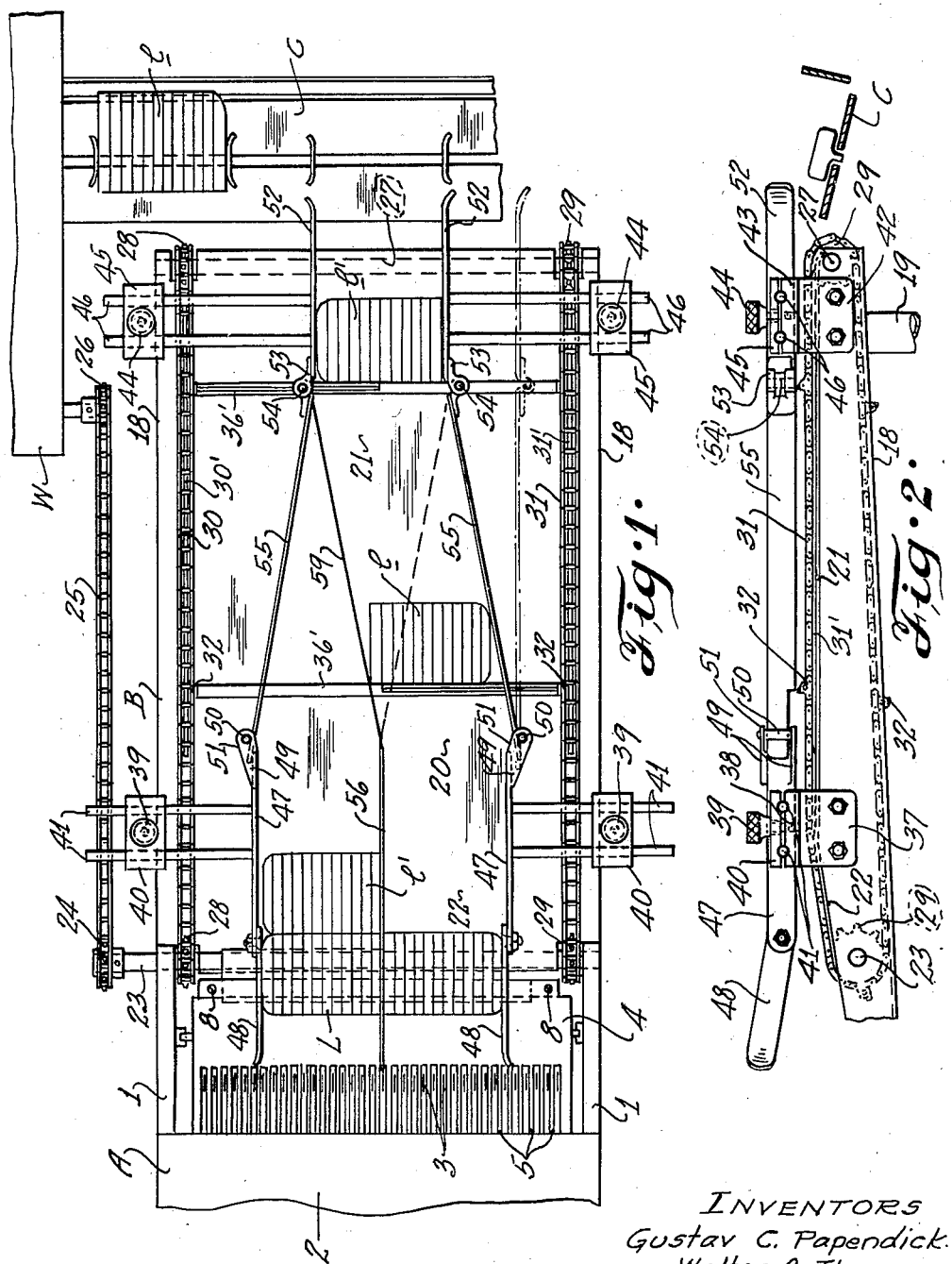
INVENTORS
Gustav C. Papendick.
Walter A. Thum.
BY
ATTORNEY July 1, 1941.  G. C. PAPENDICK ET AL  2,247,699
SLICED LOAF FRACTIONATING EQUIPMENT
Filed June 21, 1939   2 Sheets-Sheet 2
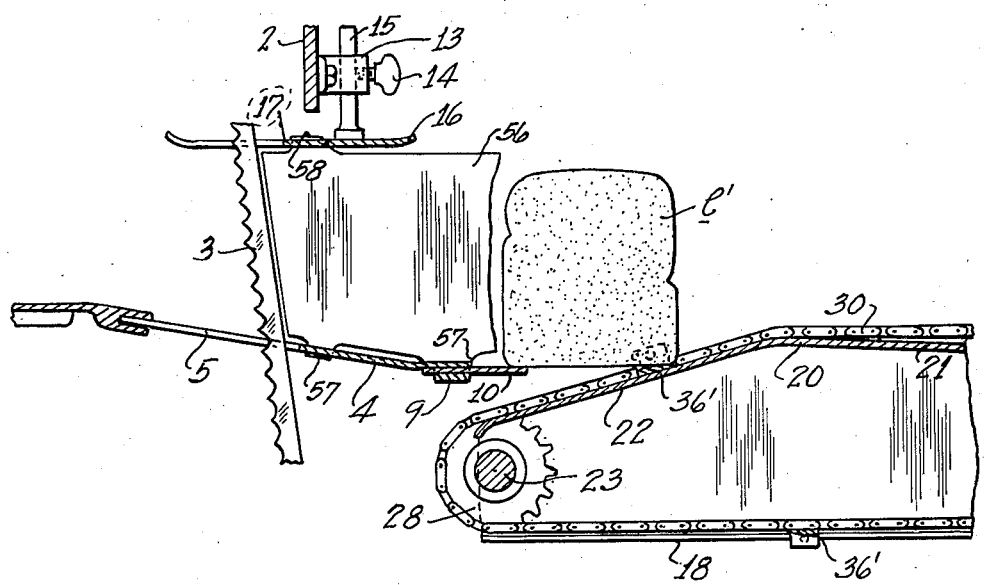
Fig. 3.
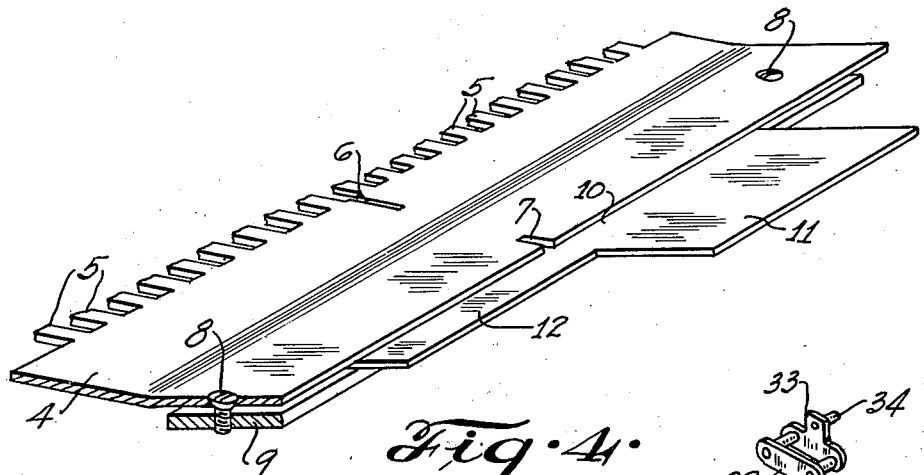
Fig. 4.
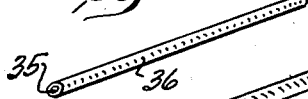
Fig. 6.
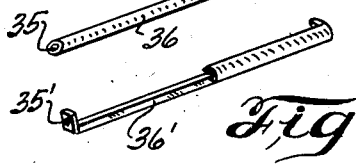
Fig. 5.
Fig. 7.
INVENTORS
Gustav C. Papendick.
Walter A. Thum.
BY
ATTORNEY Patented July 1, 1941

2,247,699

UNITED STATES PATENT OFFICE 2,247,699

SLICED LOAF FRACTIONATING EQUIPMENT

Gustav C. Papendick, University City, and Walter A. Thum, St. Louis, Mo., assignors to Papendick, Inc., St. Louis, Mo., a corporation of Missouri Application June 21, 1939, Serial No. 280,397

3 Claims. (Cl. 146—153)

This invention relates to a certain new and useful improvement in sliced loaf fractionating equipment and is related to the subject-matter of the co-pending application of Gustav C. Papendick for patent for Method and means for fractionating sliced bread-loaves, Serial No. 242,430, filed November 25, 1938.

In said co-pending application, sliced baked bread-loaf handling and fractionating equipment is disclosed, which is extremely efficient in operation and may be employed at relatively high speeds, but is designed more particularly for handling comparatively large runs of a single type of bread. Frequently, however, in a great many bakeries, the customer demand makes necessary the baking of a large number of different kinds of loaves, such as plain white, whole wheat, dark rye, Swedish rye, Vienna bread, French bread, twist bread, raisin bread, sandwich bread, and the like. Under such circumstances, the number of loaves of any one particular kind of bread is comparatively small, while the shape and size of the several kinds of loaves are so widely different as to require substantial variations in size and arrangement of the fractionating equipment.

Our invention, therefore, has for its primary objects the provision of loaf fractionating equipment which is not only highly efficient and speedy in operation, but is at the same time exceedingly flexible in its adaptability to a wide variety of loaf or fraction size, shape, and volume conditions encountered in normal bakery practice, which may be simply and quickly adjusted to meet various changes in such conditions, which is highly economical in construction, operation, and maintenance, which is extremely precise and accurate in fractionating operation, and which is highly satisfactory in the performance of its stated functions.

And with the above and other objects in view, our invention resides in the novel features of form, construction, arrangement, and combination of parts presently described and pointed out in the claims.

In the accompanying drawings (2 sheets)—

Figure 1 is a plan view of a baked bread-loaf fractionating mechanism constructed in accordance with and embodying our present invention;

Figure 2 is a side elevational view, partly broken away and in section, of the mechanism;

Figure 3 is an enlarged fragmentary sectional detail view of the mechanism;

Figure 4 is an enlarged fragmentary perspective view of the mechanism;

Figures 5 and 6 are perspective views of interchangeable flight rods of the mechanism; and Figure 7 is a detail perspective view of a flight rod engaging link of the mechanism.

Referring now in more detail and by reference characters to the drawings, which illustrate a preferred embodiment of our present invention, A designates a slicing mechanism preferably of the reciprocating knife type, which includes a pair of opposed parallel side frames 1 and a head frame 2 for operatively supporting a plurality of spaced parallel slicing knives 3.

Mounted at its side margins on, and extending transversely between, the side frames 1, is a delivery plate 4 having a plurality of rearwardly extending integral fingers or prongs 5 sized and spaced for projection between the blades 3 in the provision of a loaf supporting grid.

The delivery plate 4 is further provided on its forward and rearward margins, in alignment with a selected knife blade 3, with a pair of opposed rectilinear slots 6, 7, and mounted in the delivery plate 4 adjacent its forward margin and spaced equidistantly inwardly from its opposite side margins, respectively, are clamp screws 8 threadedly engaging a plate 9 disposed under, and registering along its forward margin with the forward margin of, the delivery plate 4 for clampwise securing against the underside of the delivery plate 4 an adjustable auxiliary or so-called hold-back plate 10 having an elongated forwardly extending or long lip 11 across half its width and a forwardly extending short lip 12 across the other half of its width, all as best seen in Figure 4 and for purposes presently fully appearing.

Bolted or otherwise fixed upon the forwardly presented face of the head frame 2, is an apertured bracket 13 threadedly provided with a binding screw 14 for adjustably supporting a hanger rod 15, in turn, provided at its lower extremity with a hold-down plate 16 having a rectilinear slot 17 in vertical alignment with the slots 6, 7, all for purposes presently fully appearing and as best seen in Figure 3.

Mounted on, and extending horizontally forwardly from, the side frames 1, is a transfer conveyor B, which includes a pair of opposed parallel side rails 18 supported at their forward ends by vertically disposed legs 19. Mounted along its longitudinal margins in, and extending transversely between, the side rails 18, is a conveyor table 20 having a forward horizontally disposed portion 21 and a rear obliquely downwardly disposed intake section 22 projecting a short distance beneath the forward margin of the delivery plate 4, all as best seen in Figures 2 and 3 and for purposes presently fully appearing.

Journaled in, and extending through, the side rails 18 and the side frames 1 below the intake section 22 of the conveyor table 20, is a drive shaft 23, fixed upon an extended end of which is a sprocket 24 connected by a drive chain 25 to the driving sprocket 26 of a wrapping machine W.

Similarly journaled in the side frames 18 and extending transversely beneath the conveyor table 20 adjacent its forward or discharge end, is an idler shaft 27.

Adjacent the side rails 18, the shafts 23 and 27 are provided with peripherally aligned pairs of sprockets 28, 29, for operatively receiving endless conveyor chains 30, 31, each provided at spaced intervals with rod-supporting links 32 having an upwardly extending flange 33 provided with an inwardly projecting pin 34 for removable engagement in the end apertures 35 of tubular flight rods 36. Fixed upon the upper face of the table 20 beneath the upper horizontal runs of the chains 30, 31, are lift tracks 30', 31', of a type and for purposes more fully disclosed in the co-pending application of Gustav C. Papendick, Serial No. 242,430.

Similarly provided with end apertures 35' for removable engagement with the projecting pins 34, are so-called cut-away flight rods 36', the latter being more particularly and fully described and disclosed in said co-pending application, Serial No. 242,430. As will presently be more fully discussed, the flight rods 36, 36', are interchangeable to permit simple conversion from one type of operation to another.

Bolted or otherwise secured upon the outwardly presented faces of the side rails 18, is a pair of opposed parallel bracket-members 37 each provided centrally in its upper horizontal face with a threaded vertically disposed recess 38 for receiving a knurled thumb screw 39 for securing thereupon a clamping plate 40, and shiftably held between each bracket 37 and its co-operable clamping plates 40, is a pair of parallel transverse rods 41.

Similarly bolted or otherwise secured upon the outwardly presented faces of, and projecting upwardly from, the side rails 18, is a pair of opposed parallel bracket members 42 each also provided centrally in its upper face with a threaded vertically disposed recess 43 for receiving a knurled thumb screw 44 for securing thereupon a clamping plate 45, and shiftably held between each bracket 42 and its co-operable clamping plate 45, is a pair of parallel transverse rods 46, all as best seen in Figure 1 and for purposes presently fully appearing.

Welded or otherwise fixed upon the inner ends of the rods 41, are opposed parallel rear guides 47 adjustably provided at their rear ends with short extension guides 48 adapted for disposition across the delivery plate 4. At their forward ends, the guides 47 are provided with a pair of outwardly presented parallel ears 49 each having a pin 50 spaced forwardly and outwardly from the adjacent end of the guide 47 in the provision of a take-up stirrup 51.

Similarly welded or otherwise fixed upon the ends of the rods 46, are opposed parallel forward guides 52 projecting forwardly over the discharge end of the transfer conveyor B over the intake conveyor C of the wrapping machine W. At their rear ends, the guides 52 are each provided with a pair of vertically spaced registering pivot eyes 53, suitably journaled in which is a pintle 54 for pivotal supporting engagement with adjustable intermediate guides 55 shiftably disposed at their rear ends through the stirrups 51 of the rear guides 47, all as best seen in Figures 1 and 2 and for purposes presently fully appearing.

Provided removably between the rear guides 47, is a divider plate 56 having downwardly projecting ears 57 and an upwardly projecting ear 58 for disposition, respectively, in the delivery plate slots 6, 7, and the hold-down plate slot 17, the plate 56 extending across the delivery plate 4 in rearwardly aligned relation to a selected slicer blade 3 and terminating at its forward margin in substantial lateral alignment with the forward ends of the rear guides 47, and being at such forward margin provided with a forwardly extending relatively flexible switching guide 59, in turn, terminating at its forward end in lateral alignment with the rear ends of the forward guides 52, all as best seen in Figure 1 and for purposes presently more fully appearing.

In the event it is desired to package unfractionated sliced bread loaves, the binding screw 14 may be loosened and the hold-down plate 16 moved slightly upwardly, thereby permitting removal of the divider plate 56 and its associated switching guide 59. At the same time, the screws 8 may be loosened and the hold-back plate 10 shifted rearwardly and inoperatively disposed under the delivery plate 4. The knurled screws 39, 44, of the guide supporting brackets 37, 42, respectively may then be loosened and the front guides 52 brought into longitudinal alignment with the rear guides 47, it being understood, of course, that both the front guides 52 and the rear guides 47 should be laterally spaced to accommodate the particular length of bread loaf being handled. As the front guides 52 are brought into longitudinal alignment with the rear guides 47, the intermediate guides 55 pivot about the pintles 54 and also move into substantial longitudinal alignment therewith, the guides 55 at their free ends slipping through the stirrups 51 to compensate for the shortened distance between the opposed extremities of the rear and front guides 47 and 52, respectively. Thereupon, tubular flight rods 36 may be disposed between the conveyor chains 30, 31, and the transfer conveyor B set in more or less conventional full loaf conveying operation.

When it is desired to fractionate the sliced bread loaves, the divider plate 56 may be replaced, the cut-away flight rods 36' substituted for the tubular flight rods 36, and the rear guides 47 adjusted to accommodate the particular length of the full sliced loaf being handled. At the same time, the front guides 52 are adjusted to accommodate the length of fraction into which the sliced loaf is being subdivided. It will, of course, be evident that, as the front guides 52 are adjusted relatively to the rear guides 47, the intermediate guides 55 will swing obliquely inwardly and slip through the stirrups 51 to compensate for the increased length between the opposed ends of the rear and front guides 47, 52, respectively. In addition, the hold-back or step plate 10 may be shifted forwardly from beneath the delivery plate 4 into operative position.

During fractionating operation, the sliced loaves L will be progressed forwardly across the delivery plate 4 and subdivided into a plurality of fractions l, l', which are discharged across the delivery plate 4 and step plate 10 upon the inclined intake section 22 of the conveyor table 20. By reference to Figure 3, it will be evident that, as the flight rods 36' move upwardly and forwardly along the inclined section 22 of the conveyor table 20, the angle between the under face of the loaf fraction *l* and the intake section 22 will be relatively sharp, so that the cut-away portion of the flight rod 36' will slip readily underneath the discharged loaf fraction and will not tend to accidentally drag such loaf fraction therealong. We have found that, by providing an inclined intake portion 22, the accuracy and precision of the cut-away flight 36' is materially increased and, in fact, functions substantially perfectly regardless of the different types and variations in size or shape of the bread being handled.

Thus the mechanism may with ease and facility be adjusted to meet the loaf or loaf-fraction sizes and shapes being handled for successive movement along the table 20 by the flight bars 36 or 36', as the case may be, for delivery in timed relation to the wrapping machine.

The mechanism fulfills in every respect the objects stated, and it should be understood that changes and modifications in the form, construction, arrangement, and combination of the several parts of the mechanism may be made and substituted for those herein shown and described without departing from the nature and principle of our invention.

Having thus described our invention, what we claim and desire to secure by Letters Patent is:

1. In a sliced loaf-fractionating machine a delivery plate having a plurality of apertures adjacent the outer margin thereof, an auxiliary plate disposed beneath the delivery plate, a plurality of bolts extending through the delivery plate aperture and threadedly mounted in the auxiliary plate for adjustably securing the auxiliary plate upon the under side of the delivery plate, and a step plate slidably and clampingly held between the auxiliary plate and the delivery plate and projecting outwardly from the transverse margin of the delivery plate in the provision of an adjustable fractionating step, said step having a margin in substantial alignment with a selected slice-cut.

2. Sliced loaf handling equipment comprising a delivery plate adapted for receiving the sliced loaves as they are discharged from a slicing machine, said delivery plate being adapted for supporting the loaves in upright position, and a transfer table adapted for receiving the sliced loaves, in upright position from the delivery plate, said table having an upwardly and forwardly inclined receiving apron disposed beneath the transverse margin of the delivery plate in the provision of a clearance gap having a width in the plane of the delivery plate smaller than the width of the loaves being handled to prevent forward tilting or falling of the loaves as they move from the delivery plate to the apron of the transfer table.

3. In a sliced loaf-fractionating machine, a delivery plate, clamping means mounted on the delivery plate and a step plate slidably and clampingly secured upon the delivery plate by said clamping means and projecting outwardly from the transverse margin of said delivery plate in the provision of an adjustable fractionating step, said step having a margin in substantial alignment with the slice-cut.

GUSTAV C. PAPENDICK.
WALTER A. THUM.